Sept. 18, 1951 F. H. SCHEER ET AL 2,568,416

FREQUENCY CONVERTER WITH IMPEDANCE MATCHED OUTPUT

Filed Sept. 20, 1947

WITNESSES:
E. A. McBlaskey
F. E. Browder

INVENTORS
Frederick H. Scheer
and William S. Winfield.
BY
Hyman Diamond
ATTORNEY Patented Sept. 18, 1951 2,568,416

UNITED STATES PATENT OFFICE 2,568,416

FREQUENCY CONVERTER WITH IMPEDANCE MATCHED OUTPUT

Frederick H. Scheer, Lewisburg, and William S. Winfield, Sunbury, Pa., assignors to Westinghouse Electric Corporation, East Pittsburgh, Pa., a corporation of Pennsylvania Application September 20, 1947, Serial No. 775,252

9 Claims. (Cl. 250—20)

Figure 1:
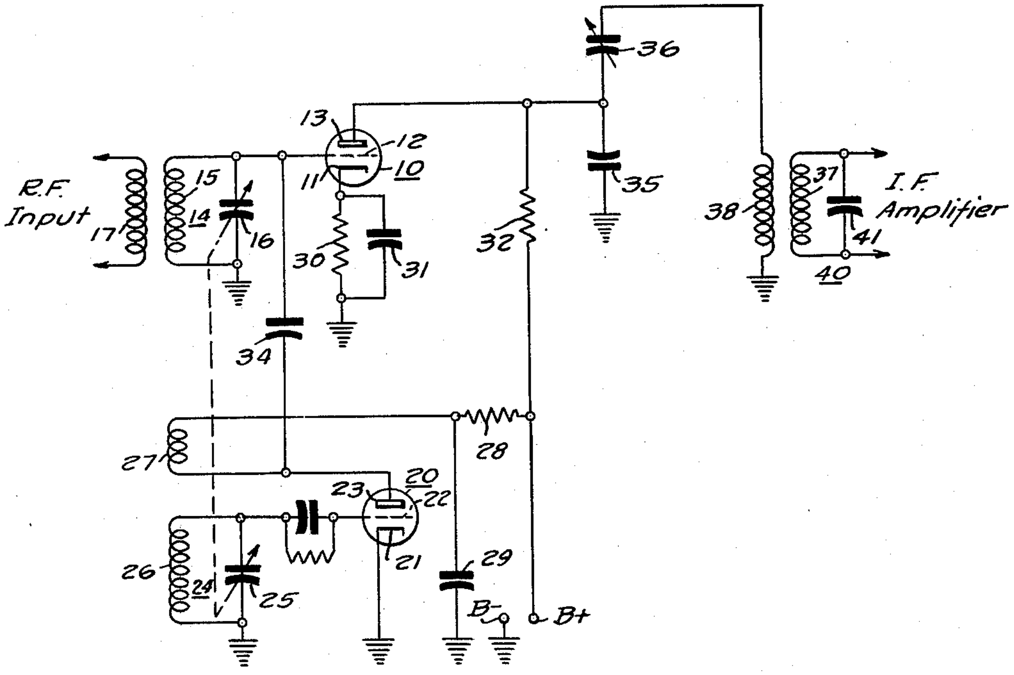

This invention relates to radio receiving apparatus, and more particularly to an improved frequency converter or heterodyne detector for superheterodyne receivers.

It is an object to provide an improved converter or heterodyne detector for superheterodyne receivers.

In such receivers, incoming radio frequency signals and oscillations or beating signals produced by a local oscillator are mixed in a converter tube. This gives rise to intermediate frequency oscillations or beats in the output circuit of the converter or detector which are the difference between the frequency of the incoming radio frequency signals and the frequency of the local oscillator signals.

In the prior art, multi-grid converter tubes have been used to combine the functions of oscillation and mixing in a single tube. A widely used type of tube for this type of operation has an anode, a cathode and five grids and is commonly known in the art as a pentagrid converter tube. It is also known in the art to use a separate tube having an anode, a cathode, and grid, and commonly known in the art as a triode, for each of the functions of the local oscillator and the converter.

It has been found that the three element, or triode, tubes used as converters in superheterodyne receivers have certain advantages over the familiar multigrid or pentagrid tubes wherein the functions of oscillating and mixing are performed in a single tube. These advantages are that the triode or three element tube has a lower equivalent noise input than the multi-grid or pentagrid tubes and they are also more readily adaptable to high frequency circuits than the pentagrid tubes.

Other characteristics of the three element or triode type of tube make it difficult to adapt it to conventional designs. This type of tube has a high grid-to-plate capacity and a low plate resistance. It has been general practice to feed the converter plate to a circuit parallel resonant to the intermediate frequency. This practice required a relatively large value of capacity and a small value of inductance in the output circuit of the converter tube so that grid-to-plate capacity feedback, which is in such phase at signal frequency to cause degeneration or loss of gain, will be minimized. The large capacity and small inductance circuit is not affected very much by the plate resistance loading of the tube, and fair selectivity results, however, the low circuit impedance at intermediate frequency results in poor conversion gain.

Accordingly, it is another object to provide an improved converter for superheterodyne receivers, utilizing a three element or triode tube wherein the disadvantages mentioned above are eliminated.

It is another object to provide an improved high gain converter for superheterodyne receivers.

It is another object to provide an improved economical converter for superheterodyne receivers.

Figure 2:
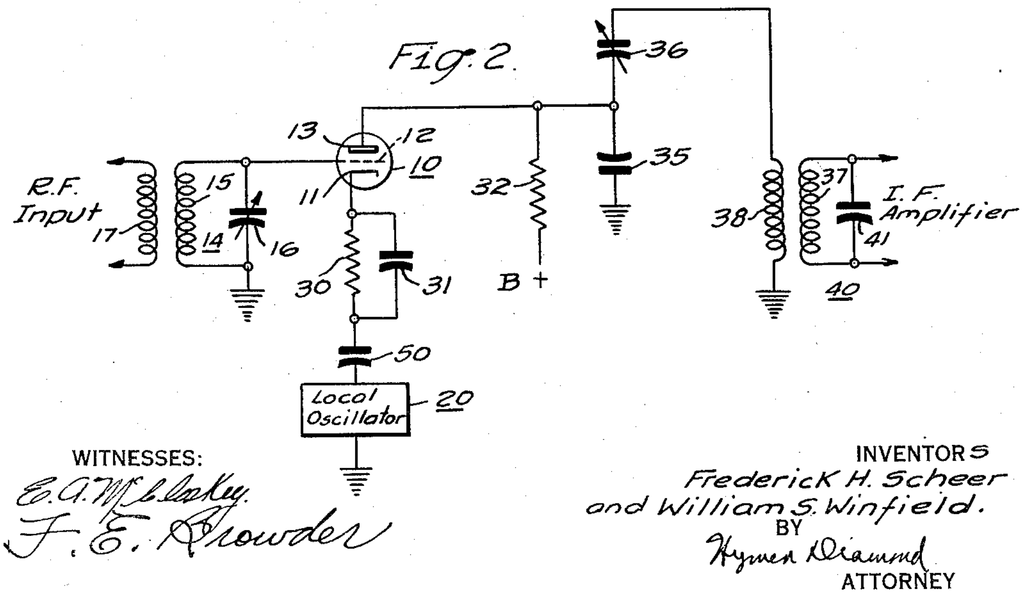

These and other objects are effected by our invention as will be apparent from the following description and claims taken in accordance with the accompanying drawing throughout which like reference characters indicate like parts, and in which:

Figure 1 is a circuit diagram of one form of frequency converter or heterodyne detector circuit in accordance with our invention; and Fig. 2 is a modification of the arrangement of Figure 1.

In Figure 1 there is shown a triode vacuum tube converter or heterodyne detector 10 comprising a cathode 11, a signal control grid 12 and a plate or anode 13. A tuned circuit 14, comprising an inductance 15 and a variable condenser 16, is connected to the grid 12. An inductance 17 is inductively coupled to the inductance 15. The inductance 17 may be connected to an antenna or other collector of radio frequency signals. It is seen that radio frequency signals are applied to the grid 12 of the converter tube 10 through the inductance 17 and the network, comprising the inductance 15 and the capacitance 16.

A local oscillator is represented by a triode tube 20, comprising a cathode 21, a grid 22, and a plate or anode 23. The grid 22 of the tube 20 is connected to a tank circuit 24 which comprises a variable capacitance 25 and an inductance 26. An inductance 27 is connected in the plate circuit of the tube 20 and provides the feedback voltage necessary to maintain the oscillator in oscillation. The plate 23 of the tube 20 is connected to the positive terminal of a suitable power source (not shown) through a dropping resistor 28. The negative terminal of the power source is connected to ground. A by-pass condenser 29 is provided to prevent the radio frequency oscillations from passing through the power source.

The grid 12 of the converter tube 10 is properly biased by a resistor 30 by-passed by a condenser 31, connected in series with the cathode 11. The plate 13 is connected to the positive terminal of the power source through a dropping resistor 32.

Oscillations or signals supplied by the local oscillator 20 are injected into the converter tube 10 upon the grid 12 thereof through a coupling condenser 34.

An intermediate frequency circuit or network, comprising a relatively large fixed condenser 35 connected in parallel with a smaller adjustable condenser 36 and a serially connected inductance 38, is connected in the output or plate circuit of the converter tube 10. The circuit comprising the condenser 35 provides a low reactance path for radio and local oscillator frequencies appearing in the anode circuit. The composite circuit, comprising the condenser 35 and serially connected condenser 36, and inductance 37 connected in parallel with the condenser 35, is tuned to parallel resonance at the intermediate frequency and provides a high impedance to the intermediate or beat frequency appearing in the plate circuit of the converter. The intermediate frequency signals are coupled to the next stage of the receiver, which may be an intermediate frequency amplifier, by a tuned network comprising a condenser 41 and an inductance 37, the inductance 37 being inductively coupled to the inductance 38. The inductances 37 and 38, and the condensers 35, 36 and 41 comprise what is commonly known in the art as an intermediate frequency transformer 40.

In the operation of the circuit, incoming radio frequency signals will be induced into the tuned circuit 14 and applied to the control grid 12 of the converter tube 10. At the same time, oscillations from the local oscillator 20 will be impressed upon the control grid 12 of the converter tube 10 through the coupling condenser 34. The variable condensers 16 and 25 are ganged so as to properly track when the circuits are tuned over the radio frequency band.

An intermediate frequency or beat note will appear in the plate circuit 13 of the converter tube 10 equal to the sum or difference of the local oscillator frequency and the incoming radio frequency signals. This intermediate frequency or beat frequency will be applied across the network comprising the condensers 35 and 36 and the inductance 38. This network is parallel resonant at the intermediate frequency and presents a high impedance to the intermediate or beat frequency, while the large capacity condenser 35 provides a low reactance path for high frequencies appearing in the plate circuit 13 of the converter tube 10.

The intermediate frequency signals or oscillations appearing across the inductance 38 are applied by means of the tuned circuit 40 to an intermediate frequency amplifier which may be the next stage of the receiver.

The circuit of Fig. 1 conduces to high conversion gain in several ways. It is seen that the large condenser 35 permits matching of the output impedance to the plate impedance of the tube 10. This permits maximum conversion gain within the tube 10 and also permits maximum power transfer from the converter to the intermediate frequency system. The loading effect of the plate 13 of the tube 10 is over that portion only of the intermediate frequency circuit comprising condenser 35. This permits an intermediate frequency circuit having a high Q, which enables optimum voltage to be developed across the inductance 38 at intermediate frequencies. This contributes to the gain of the converter.

The radio frequencies are shorted out of the plate circuit through the condenser 35. This prevents these signals or voltages from feeding back to the grid 12 through the grid to plate capacitance to cause degeneration or decrease of conversation gain. Local oscillator signals are also shorted out of the plate circuit through the condenser 35. This tends to prevent the oscillator signals from beating or heterodyning with harmonics of the intermediate frequency to produce annoying beats, or what is commonly known as tweets. This reduction or minimizing of the oscillator signals at the plate decreases the possibility of plate saturation with oscillator signals or voltages. This makes possible wider plate swings with intermediate frequencies before the plate circuit overloads.

The circuit shown in Fig. 2 is identical to that shown in Fig. 1, except the output from the local oscillator 20 is injected into the converter tube 10 upon the cathode 11 thereof through a condenser 50. This circuit operates in substantially the same manner as the circuit of Fig. 1. In addition to the advantages stated for the circuit of Fig. 1, this circuit possesses the advantage that oscillator signals or voltages appearing at the plate 13 of tube 10 across the condenser 35 are applied to the grid through the grid-to-plate capacity and cancel out oscillator voltages appearing on the grid 12 through the grid to cathode capacitance and the wiring. This further increases the conversion gain of the tube 10 by the reduction of self bias from the local oscillator signals or voltages.

Satisfactory receivers have been designed and operated using values of 470 micro-microfarads for the condenser 35, 127 micro-microfarads for the condenser 36, and 1.3 micro-henries for the inductance 37. These parameters provided a circuit which tuned to an intermediate frequency of 455 kilocycles. This arrangement conduces to simplicity of design in that a simple conventional intermediate frequency transformer may be used since the inductances 38 and 37 may be of the same size and have the same number of turns. This design gave a higher conversion gain and better stability than had been attained with triode converters used herebefore.

From the foregoing description, it is seen that we have provided an improved triode converter or first detector for use in superheterodyne receivers which provides high conversion gain and good selectivity.

While we have shown our invention in several forms, it will be obvious to those skilled in the art that it is not so limited, but is susceptible of various other changes and modifications without departing from the spirit and scope thereof, and we desire, therefore, that only such limitations shall be placed thereupon as are specifically set forth in the appended claims.

We claim as our invention:

1. In a converter for a superheterodyne type radio receiver, in combination, a tube having a cathode, an anode, and a signal grid, means for impressing radio frequency signals upon said grid, a local oscillator, means for impressing oscillations produced by said oscillator upon said grid to beat with said radio frequency signals and produce an intermediate frequency in the anode circuit of said tube, a circuit comprising a relatively large capacitance which presents a low impedance to radio frequencies connected in the anode circuit of said tube, a second circuit comprising a small capacitance which presents a relatively higher impedance to radio frequencies than said first capacitance and a serially connected inductance connected in parallel with said first circuit, said first and second circuits being tuned to parallel resonance at said intermediate frequencies.

2. In a converter for a superheterodyne type radio receiver, in combination, a tube having a cathode, an anode, and a signal grid, means for impressing radio frequency signals upon said grid, a local oscillator, means for impressing oscillations produced by said local oscillator upon said grid to beat with said radio frequency signals and produce an intermediate frequency in the anode circuit of said tube, and a multiple leg network connected to said anode circuit, said network comprising in one leg thereof a relatively large fixed capacitance for by-passing radio frequencies and local oscillator frequencies, and comprising in another leg thereof an inductance, and an adjustable capacitance which is relatively smaller than said fixed capacitance connected in series with said inductance for tuning said network to resonance at said intermediate frequency.

3. In a frequency converter, in combination, a tube having a cathode, an anode, and a signal grid, means for impressing radio frequency signals upon said signal grid, means for injecting beating signals into said tube to produce an intermediate frequency in the anode circuit of said tube, and capacitive load circuit means connected to the anode of said tube to match the anode impedance of said tube to the impedance of said load circuit to effect high conversion gain within said tube, said load circuit having multiple paths and comprising in one path a capacitor of relatively large value and in another path a capacitor of relatively small value and a serially connected inductance.

4. In a frequency converter, in combination, a tube having a cathode, an anode, and a signal grid, means for impressing radio frequency signals upon said signal grid, means for injecting beating signals into said tube, to produce intermediate frequency signals in the anode circuit of said tube, a multiple path intermediate frequency circuit tuned to parallel resonance at said intermediate frequency connected to the anode of said tube, said circuit having in one path a capacitor of relatively large value and in another path a capacitor of relatively small value and a serially connected inductance for matching the anode impedance of said tube to the impedance of said intermediate frequency circuit to effect maximum power transfer from said converter to said intermediate frequency circuit.

5. In a frequency converter, in combination, a tube having a cathode, an anode, and a signal grid, means for impressing radio frequency signals upon said grid, means for interjecting beating signals into said tube to produce an intermediate frequency in the anode circuit of said tube, an intermediate frequency network connected to said anode circuit, said network comprising a capacitor of relatively large value connected between said anode circuit and ground, and a second capacitor of relatively small capacitance compared to said first capacitor and a serially connected inductance connected between said anode circuit and ground in parallel with said first capacitor, the said parallel network being tuned to parallel resonance at said intermediate frequency.

6. In a radio frequency converter, in combination, a tube having a cathode, an anode, and a signal grid, means for impressing radio frequency signals upon said signal grid, means for injecting beating signals into said tube to produce an intermediate frequency in the anode circuit of said tube, an intermediate frequency network having two parallel legs connected in said anode circuit and tuned to parallel resonance at the intermediate frequency, said circuit having in one leg a capacitor of relatively large capacitance and having in the other leg a capacitor of relatively small capacitance compared to said first capacitor and a serially connected inductance, said second capacitance being adjustable to tune said net work to parallel resonance at said intermediate frequency.

7. In a converter for a superheterodyne type radio receiver, in combination; a tube having a cathode, an anode and a signal grid; a direct current power source for said tube having positive and negative terminals; means for impressing radio frequency signals upon said grid; a local oscillator; means for injecting oscillations produced by said local oscillator into said tube to beat with said radio frequency signals and produce an intermediate frequency in the anode circuit of said tube; an output circuit tuned to said intermediate frequency connected to the anode of said tube, said output circuit comprising a relatively large capacitance connected between said anode and the negative terminal of said power source for matching the anode impedance of said tube to said output circuit, a relatively small adjustable capacitance compared to said first capacitance and a serially connected inductance connected between the anode of said tube and the negative terminal of said power source, and means connecting the positive terminal of said power source to said anode ahead of said output circuit so that the direct current component of the anode current of said tube does not affect said load circuit.

8. In a converter for a superheterodyne type radio receiver, in combination; a tube having a cathode, an anode, and a signal grid; a direct current power source for said tube having positive and negative terminals; means for impressing radio frequency signals upon said grid; a local oscillator; means for injecting oscillations produced by said local oscillator into said tube to beat with said radio frequency signals and produce an intermediate frequency in the anode circuit of said tube; a high Q output circuit tuned to said intermediate frequency connected to the anode of said tube, said output circuit comprising a relatively large capacitance connected between said anode and the negative terminal of said power source for matching the anode impedance of said tube to said output circuit, a relatively small adjustable capacitance compared to said first capitance and a serially connected inductance connected between the anode of said tube and the negative terminal of said power source, and means connecting the positive terminal of said power source to said anode ahead of said output circuit so that the direct current component of the anode current of said tube does not affect said load circuit.

9. In a converter for a superheterodyne type radio receiver, in combination; a tube having a cathode, an anode and a signal grid; a direct current power source for said tube, said power source having positive and negative terminals; means connecting the positive terminal of said power source to said anode; means for impressing radio frequency signals upon said grid; a local oscillator; means for injecting oscillations produced by said local oscillator into said tube to beat with said radio frequency signals and produce an intermediate frequency in the anode circuit of said tube; an output circuit tuned to said intermediate frequency connected to said anode, said output circuit comprising a relatively large capacitance connected between said anode and the negative terminal of said power source, and a small capacitance relative to said first capacitance and a serially connected inductance connected between said anode circuit and the negative terminal of said power source, said small capacitance serving to isolate said inductance from the direct current component of the anode current from said tube.

FREDERICK H. SCHEER.
WILLIAM S. WINFIELD.

REFERENCES CITED

The following references are of record in the file of this patent:

UNITED STATES PATENTS

| Number | Name | Date |
|---|---|---|
| 1,968,610 | Mathieu | July 31, 1934 |
| 2,152,335 | Trevor et al. | Mar. 28, 1939 |
| 2,236,004 | MacLean | Mar. 25, 1941 |
| 2,277,638 | George | Mar. 24, 1942 |
| 2,370,758 | Thompson | Mar. 6, 1945 |